O. BARTA.
STERILIZER.
APPLICATION FILED NOV. 27, 1917.

1,286,914.

Patented Dec. 10, 1918.
2 SHEETS—SHEET 1.

WITNESSES
William P. Jones.

INVENTOR
Otto Barta
BY
Conrad A. Dietrich
his ATTORNEY

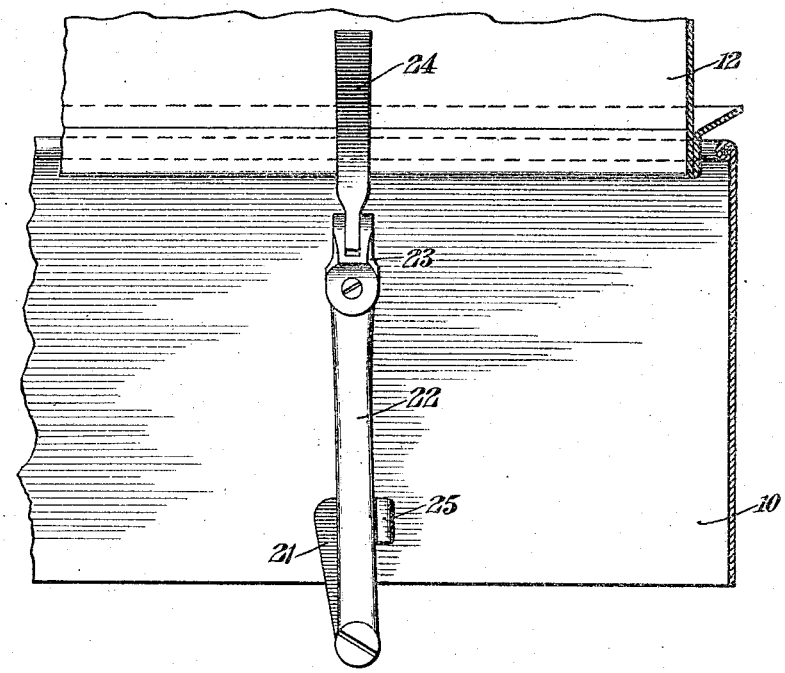
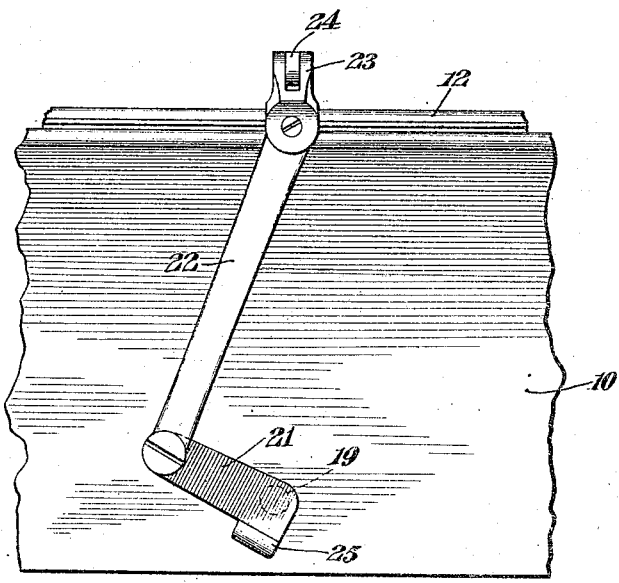

UNITED STATES PATENT OFFICE.

OTTO BARTA, OF BROOKLYN, NEW YORK, ASSIGNOR TO THE PROMETHEUS ELECTRIC COMPANY, A CORPORATION OF NEW YORK.

STERILIZER.

1,286,914.  Specification of Letters Patent.  Patented Dec. 10, 1918.

Application filed November 27, 1917.  Serial No. 204,136.

*To all whom it may concern:*

Be it known that I, OTTO BARTA, residing at the city of New York, borough of Brooklyn, county of Kings, in the State of New York, have invented certain new and useful Improvements in Sterilizers, of which the following is a full, clear, and exact specification.

This invention relates to improvements in sterilizers of the type employed by physicians and surgeons for sterilizing instruments, bandages and the like and has for its principal object to provide an apparatus of this character in which the tray containing the articles to be sterilized is lifted to the upper portion of the sterilizer as the cover thereof is opened.

Further, the invention has for its object to provide means for opening and closing the cover of the sterilizer which will be positive in its action and which is not liable to be accidentally actuated.

Further, the invention has for its object to provide means for opening and closing the cover of the sterilizer which will lock the cover against accidental closing when the same is in open position.

Further, the invention has for its object to provide the tray with movable handles in order that it may readily be removed from the lifting means carried by the cover.

Other objects will in part be obvious and in part be pointed out hereinafter.

To the attainment of the aforesaid objects and ends my invention consists in the novel details of construction, and in the combination, connection and arrangement of parts hereinafter more fully described and then pointed out in the claims.

In the accompanying drawings showing an illustrative embodiment of the invention—

Fig. 3 is a detail view on an enlarged scale of the cover actuating mechanism, the parts being shown in the position which they occupy when the cover is open; and Fig. 4 is a view similar to Fig. 3 showing the position of the parts of the cover actuating mechanism when the cover is closed.

Figure 1:
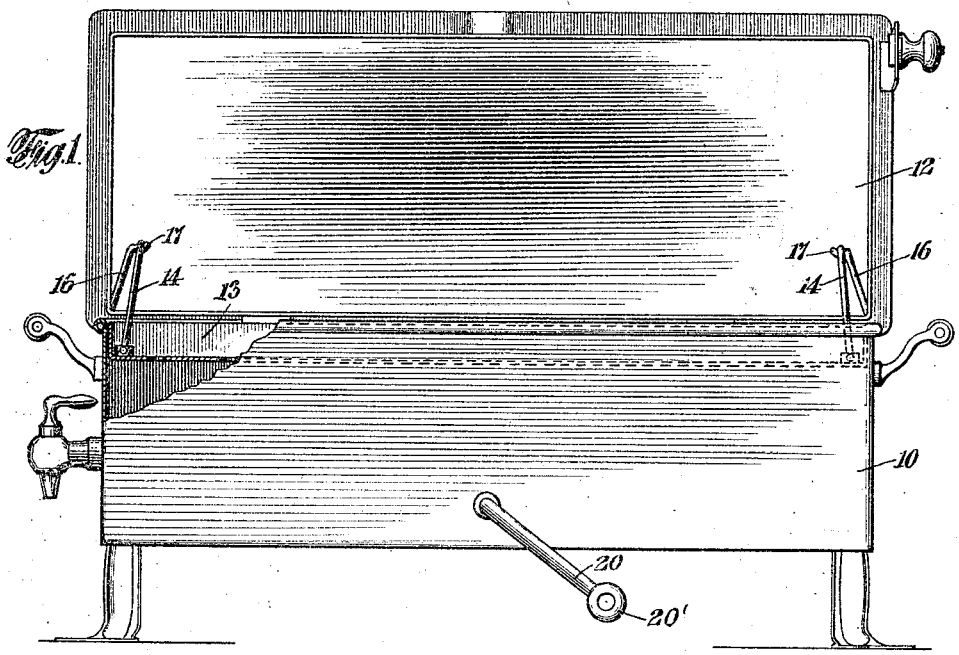
Figure 1 is a front elevational view of a sterilizer, the cover being shown open.

Referring to the drawings the sterilizer comprises a casing 10 having in its upper portion a sterilizing chamber provided with a cover 12 hinged to the casing at the rear thereof.

13 indicates a tray adapted to hold the articles to be sterilized and to be received within the sterilizing chamber. At its ends the tray 13 is provided with handles 14 which are pivotally secured thereto to enable them to be swung inwardly for purposes hereinafter described. Springs 15 are preferably provided for maintaining the handles 14 in their upright positions.

Figure 2:
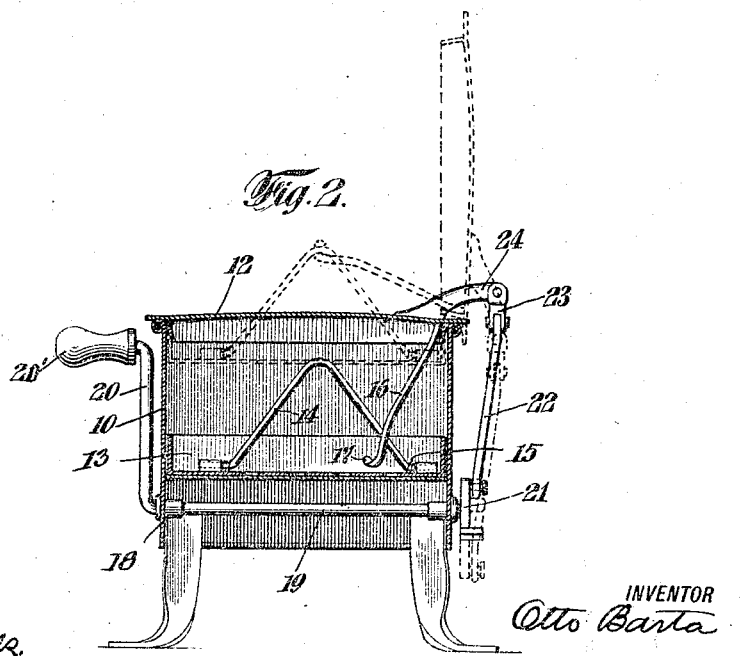
Fig. 2 is a sectional view taken on the line 2—2 of Fig. 1, the cover being shown closed in full lines, and open in dotted lines.

Secured to the inner surface of the cover 12 adjacent the ends thereof and inclined downwardly therefrom are arms 16 having inwardly extending hooked end portions 17 adapted to engage the handles 14 of the tray 13 and to lift it to the top of the sterilizing chamber as the cover 12 is raised, as shown in dotted lines in Fig. 2.

Journaled within bearings 18—18 supported by the front and rear walls of the casing 10, preferably at the center thereof, is a shaft 19 provided at its front end with a crank 20 carrying a handle 20'. Secured to the rear end of the shaft 19 is an arm 21 having its free end pivotally connected to one end of a link 22, the other end of the link being pivotally connected to a yoke 23, which, in turn, is pivotally connected to a bracket 24 secured to the cover 12. The arm 21 is provided with a laterally offset stop 25 adapted to be engaged by the link 22 when the cover 12 is in its open position, as shown in Fig. 3. The stop 25 is so positioned that it will not be engaged by the link 22 until the lower end thereof has traveled beyond a vertical line passing through the pivotal point of connection of the upper end of the link 22 with the yoke 23, whereby when the link 22 engages the stop 25 the cover will be locked against accidental closing when in its open position and can not be closed except by rotating the shaft 19.

During the sterilizing operation the tray 13 containing the articles to be sterilized is positioned within the lower portion of the sterilizing chamber and the cover is closed as shown in full lines in Fig. 2. In this position of the cover 12 the hooked ends 17 of the arms 16 are out of engagement with the handles 14 of the tray 13. The handles 14, however, are held in their vertical positions by the springs 15 so that they will be in the path of the hooked ends 17 of the arms 16. When the sterilizing operation is completed the crank 20 is turned by means of the handle 20' thereby rotating the shaft 19 and the arm 21 secured to the rear end thereof. As the arm 21 is rotated it will actuate the link 22 to open the cover 12 and as above described, when the link 22 reaches the end of its travel and engages the stop 25 the cover 12 will be fully opened and locked against accidental closing. As the cover opens, the hooked ends 17 of the arms 16 are moved into engagement with the handles 14 of the tray 13 whereupon the further opening movement of cover 12 will cause the tray 13 to be lifted out of the heated water and held within the upper portion of the sterilizing chamber as shown in dotted lines in Fig. 2. To repeat the sterilizing operation it is merely necessary to rotate the crank 20 in the opposite direction thereby closing the cover 12 and at the same time, permitting the tray 13 to be lowered within the sterilizing chamber.

If, when the cover 12 is open, it is desired to remove the tray 13 it is merely necessary to grasp the handles 14 and lift them sufficiently to disengage them from the hooked ends 17 of the arms 16, after which by swinging the handles 14 inwardly out of the path of the hooked ends, the tray 13 may readily be removed.

Having thus described my said invention what I claim and desire to secure by Letters Patent is:—

1. A sterilizer comprising a casing provided with a sterilizing chamber, a cover hinged to said casing and adapted to close said chamber, a rotatable shaft supported by said casing and extending transversely thereof, means for rotating said shaft, means operatively connected to said shaft and to said cover to open and close the same as said shaft is rotated, a tray, and means carried by said cover for lifting said tray within said chamber as said cover is raised, substantially as specified.

2. A sterilizer comprising a casing provided with a sterilizing chamber, a cover hinged to said casing and adapted to close said chamber, a rotatable shaft supported by said casing, means for rotating said shaft, an arm secured to said shaft, a link operatively connected to said arm and to said cover, whereby to open and close said cover as said shaft is rotated, a tray, and means carried by said cover to lift said tray within said chamber as said cover is raised, substantially as specified.

3. A sterilizer comprising a casing provided with a sterilizing chamber, a cover hinged to said casing and adapted to close said chamber, a rotatable shaft supported by said casing, means for rotating said shaft, an arm secured to said shaft, a link operatively connected to said arm and to said cover, whereby to open and close said cover as said shaft is rotated, said arm being provided with a stop adapted to be engaged by said link when said cover is in its open position, a tray, and means carried by said cover to lift said tray within said chamber as said cover is raised, substantially as specified.

4. A sterilizer comprising a casing provided with a sterilizing chamber, a cover hinged to said casing and adapted to close said chamber, a rotatable shaft supported by said casing, means for rotating said shaft, an arm secured to said shaft, a link having its lower end pivotally connected to said arm and its upper end pivotally connected to said cover whereby to open and close said cover as said shaft is rotated, said arm being provided with a stop adapted to be engaged by said link after its lower end has traveled beyond a vertical line passing through the pivotal point of connection of the upper end of said link with said cover, whereby said cover will be locked in its open position, a tray, and means carried by said cover for lifting said tray within said chamber as said cover is raised, substantially as specified.

5. A sterilizer having a sterilizing chamber, a cover therefor, tray lifting means carried by said cover, a tray having handles movably secured thereto, and means normally holding said handles in the path of said tray lifting means whereby as said cover is raised said tray will be lifted within said chamber, substantially as specified.

6. A sterilizer having a sterilizing chamber, a cover therefor, tray lifting means carried by said cover, a tray having handles movably secured thereto, and yielding means normally holding said handles in the path of said tray lifting means whereby as said cover is raised said tray will be lifted within said chamber, substantially as specified.

7. A sterilizer having a sterilizing chamber, a cover therefor, tray lifting means carried by said cover, a tray having handles movably secured thereto, and springs normally holding said handles in the path of said tray lifting means whereby as said cover is raised said tray will be lifted within said chamber, substantially as specified.

Signed at the city of New York, borough of Manhattan, county of New York, in the State of New York, this 21st day of May, one thousand nine hundred and seventeen.

OTTO BARTA.

Witnesses:
 CONRAD A. DIETERICH,
 WILLIAM P. JONES.

Copies of this patent may be obtained for five cents each, by addressing the "Commissioner of Patents, Washington, D. C."